United States Patent [19]

Cybulski et al.

[11] Patent Number: 4,744,530
[45] Date of Patent: May 17, 1988

[54] CARTRIDGE DOOR-LATCHING MECHANISM

[75] Inventors: Claude E. Cybulski; Gregory H. Johnson, both of St. Paul, Minn.

[73] Assignee: Minnesota Mining and Manufacturing Company, St. Paul, Minn.

[21] Appl. No.: 906,445

[22] Filed: Sep. 12, 1986

[51] Int. Cl.⁴ ............................................ G11B 23/04
[52] U.S. Cl. .................................... 242/198; 360/132
[58] Field of Search ............... 242/198, 197, 199, 200; 360/85, 95, 132

[56] References Cited

U.S. PATENT DOCUMENTS

| | | | |
|---|---|---|---|
| 4,323,207 | 4/1982 | Gebeke | 242/198 |
| 4,466,583 | 8/1984 | Giannis et al. | 242/198 |
| 4,475,700 | 10/1984 | MacLeod, Jr. et al. | 242/197 |
| 4,572,461 | 2/1986 | Hovikawa et al. | 242/198 |
| 4,628,389 | 12/1986 | Tanaka et al. | 242/198 X |

Primary Examiner—Donald Watkins
Attorney, Agent, or Firm—Donald M. Sell; James A. Smith; David W. Anderson

[57] ABSTRACT

Door-latching mechanism for a molded plastic cartridge includes a plastic arm projecting from a wall of the cartridge and acting as a cantilevered spring. At the free end of the arm are a door-locking pawl which locks the door when the spring is at rest and unlocks the door when the spring is flexed. When the cartridge is a VHS or Betamax videocassette, upon inserting it into a recorder, a finger of the recorder depresses the arm and with it the door-locking pawl, thus unlocking the pawl and allowing the door to be opened. The arm may either be integral with the cartridge or molded as a separate plastic piece to be attached to the cartridge.

6 Claims, 2 Drawing Sheets

CARTRIDGE DOOR-LATCHING MECHANISM

BACKGROUND OF THE INVENTION

1. Field of the Invention

The invention concerns a latching mechanism for a cartridge door such as the visor-like door of a videocassette of the VHS or Betamax format.

2. Description of the Related Art

The visor-like door of a VHS or Betamax videocassette is spring-loaded to open when a latch is depressed upon contacting a finger of the recorder. Originally, the latching mechanism for each of those videocassettes had two pieces, typically a molded plastic latch plate and a metal spring. The recently issued U.S. Pat. No. 4,475,700 (MacLeod et al.) discloses such a 2-piece door-latching mechanism for a VHS videocassette which is said to be easier to assemble and less expensive than prior 2-piece mechanism.

Some VHS videocassettes that have recently appeared on the market employ a latching mechanism consisting of a single piece of molded plastic such as shown in U.S. Pat. No. 4,466,583 (Giannis et al.). Although such a latching mechanism simplifies assembly and should be significantly less expensive, its plastic spring member, the "elongate resilient arm 60" of FIGS. 1-5, is under compression when the door is closed as can be seen by comparing FIGS. 7 and 8. Because any plastic member will experience plastic flow or creep if kept under compression, the arms 60 and 68 should gradually lose their effectiveness as spring members, especially in warm weather.

We are not aware of any simplification of the 2-piece latching mechanism of the Betamax videocassette, the latch of which is formed with an inclined plane which, upon being contacted by the aforementioned finger of the recorder, is depressed to unlock the door.

SUMMARY OF THE INVENTION

The invention provides a cartridge door-latching mechanism that either does not require a separate assembly step or is assembled more easily. The novel door-latching mechanism, although entirely molded plastic, has substantially no plastic-flow problems. Furthermore, we believe it to be far more cost effective than any door-latching mechanism heretofore proposed for the VHS or Betamax videocassettes.

Briefly, the novel cartridge door-latching mechanism comprises a molded plastic casing on which is pivotably mounted a door affording access to the interior of the cartridge. A wall of the casing is formed with an opening, and a plastic arm projects from the wall to provide a cantilevered plastic spring. The free end of the arm is formed with a door-locking pawl which extends through the opening, locks the door when the spring is at rest, and unlocks the door when the spring is flexed.

When the cartridge is a VHS or Betamax videocassette, the opening is formed in a sidewall of the base of the casing. When the cartridge is a VHS videocassette, the free end of the arm may be formed with two outward-projecting knobs, one in position to serve as said door-locking pawl and the other an unlocking knob in position to be depressed to unlock the pawl. Upon inserting the videocassette into a VHS recorder, a finger of the recorder depresses the unlocking knob and with it the door-locking pawl, thus unlocking the pawl and allowing the door to be opened.

When the cartridge is a Betamax videocassette, the free end of the arm may be formed with an outward-projecting knob in position to serve as said door-locking pawl, and also formed with an inclined plane which functions in the same manner as do the inclined planes of latches of previous Betamax videocassettes.

In VHS and Betamax designs, the arm of the novel door-latching mechanism remains in the flexed position while the videocassette is in place in the recorder, but because any given videocassette is rarely in a recorder for more than a small fraction of its life, this should not result in a damaging degree of plastic flow. Immediately upon removing the videocassette, the arm is released and returns to its unflexed, at-rest position with the door-locking pawl in place to lock the door.

For utmost economy, the arm of the novel door-latching mechanism is integral with the casing. However, because plastics which are most economical for the casing may have limited fatigue life, it may be preferred to mold the arm as a separate plastic piece to be attached to the casing. In such event, the casing may be formed with a groove, and said separate piece of plastic may be formed with a groove, and said groove, preferably an interference fit. In a VHS or Betamax videocassette, the groove will preferably extend from the open edge of the sidewall about ¾ of the sidewall height, and the tongue may slide into the groove from said open edge and then be secured by assembling the cover to the base.

Plastics currently favored for molding the casings of videocassettes are polystyrene and acrylonitrile-butadiene-styrene (ABS) resins, the former being more widely used because it is of lower cost, is easy to mold with good accuracy, and has adequate resistance to impact. The cantilevered spring of the novel door-latching mechanism has higher flexural modulus and better resistance to both fatigue and plastic flow when the arm is molded from acetal resin. Because acetal resin tends to warp and does not lend itself to incorporation of welded windows, it is not preferred for molding the entire casing, but it may be used to mold the arm as a separate piece while the casing is molded from polystyrene or ABS resin.

BRIEF DESCRIPTION OF THE DRAWING

In the drawing, all figures of which are schematic.

DESCRIPTION OF THE PREFERRED EMBODIMENT

Figure 1:
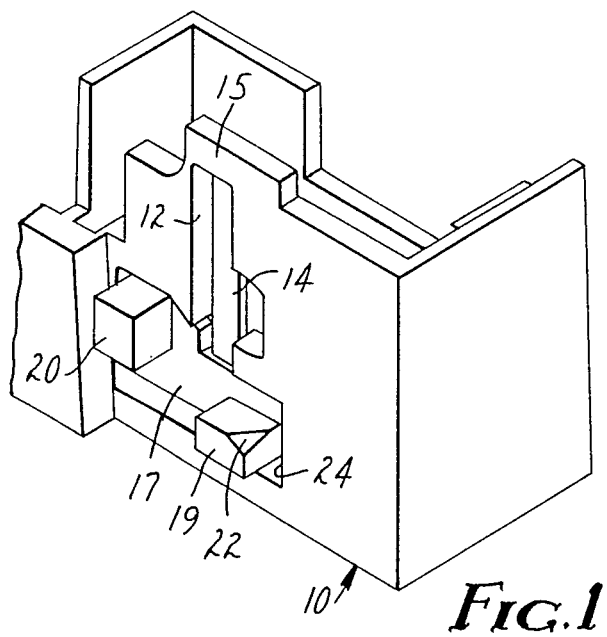
FIG. 1 is a fragmentary isometric view of a VHS videocassette showing a door-latching mechanism of the invention.
Figure 2:
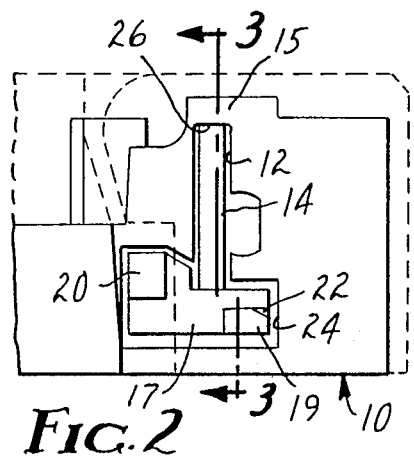
FIG. 2 is an elevation of the door-latching mechanism of FIG. 1.
Figure 3:
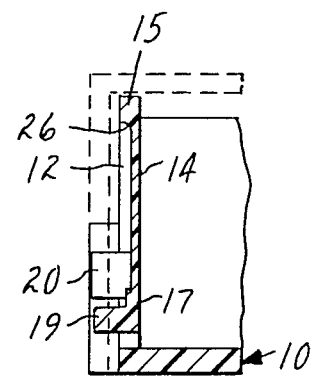
FIG. 3 is a cross section along line 3—3 of FIG. 2.

The videocassette fragmentally illustrated in FIGS. 1-3 has a molded plastic base 10 and cover (shown in phantom in FIG. 2), together providing a casing on which is pivotably mounted a visor-like door (shown in phantom in FIGS. 2 and 3) that affords access to the interior of the videocassette. Formed in the base 10 is an opening 12 and an arm 14 which is integrally molded with the upper portion 15 of the vertical wall of the base and projects from an edge of the opening to provide a cantilevered spring. At the free end of the arm is formed a small plate 17 from which outwardly project two knobs, one serving as a door-locking pawl 19 and the other as an unlocking knob 20. Upon inserting the videocassette into a recorder (not shown), a finger of the recorder depresses the unlocking knob, thus pivotably flexing the arm 14 and carrying with it the door-locking pawl 19. Retraction of the pawl releases the door to be opened by forces exerted in loading the videocassette into the recorder. Upon removing the videocassette from the recorder, the spring action of the arm 14 returns the plate 17 with its pawl and unlocking knob to the position illustrated in FIGS. 1-3 at which the arm 14 is unflexed or at rest. Simultaneously the recorder releases the door which is spring-loaded to close and upon doing so, its catch strikes the chamfer 22 on the pawl 19, thus momentarily pivotably flexing the arm until the catch of the door slides past the pawl.

As can best be seen in FIG. 2, the door-locking pawl 19 should be closely spaced from the adjacent edge 24 of the opening 12 so that when the door-locking pawl engages the door, any force tending to accidentally open the door pushes the pawl 19 against said adjacent edge. If there were a larger space, the door might develop sufficient momentum to cause the pawl to slide past the inside of that edge thus accidentally unlocking the door.

As can be seen in FIG. 3, the arm 14 at the edge of the opening 12 is thinner than the wall of the base 10, necking down at a radius 26 in order to distribute the fatigue upon flexing. In a VHS or Betamax videocassette, the arm must be thinner than the wall of the base to meet specifications, each specification requiring the force to unlock the door to be about 15 grams of force (gf) or less. Preferably the arm is sufficiently stiff to require an unlocking force of at least 10 gf to provide adequate security against the door becoming unlocked accidentally.

Figure 4:
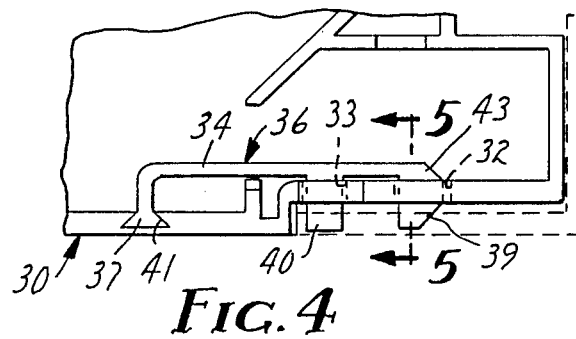
FIG. 4 is a fragmentary elevation of another VHS videocassette which has a second door-latching mechanism of the invention.
Figure 5:
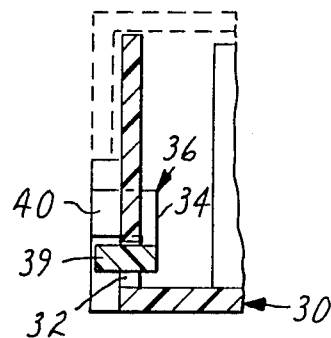
FIG. 5 is a cross section along line 5—5 of FIG. 4.

The VHS videocassette fragmentally illustrated in FIGS. 4 and 5 has a molded plastic base 30 and cover (not shown) that together provide a casing on which is pivotably mounted a visor-like door (shown in phantom). A separately molded plastic piece 36 is formed with an arm 34, at one end of which is a tongue 37 that is triangular in cross section. The base 30 is formed with a groove 41, also triangular in cross-section, into which the tongue 37 slideably fits, after which the tongue is secured in place by assembling the cover to the base. At the free end of the arm 34 is an unlocking knob 40 and an extension 43 from which outwardly projects a door-locking pawl 39 which also has a knob shape. The pawl 39 and knob 40 extend through an opening 32 in the base 30 and function in the same way as do the pawl 19 and knob 20, respectively, of the videocassette of FIGS. 1-3.

Figure 6:
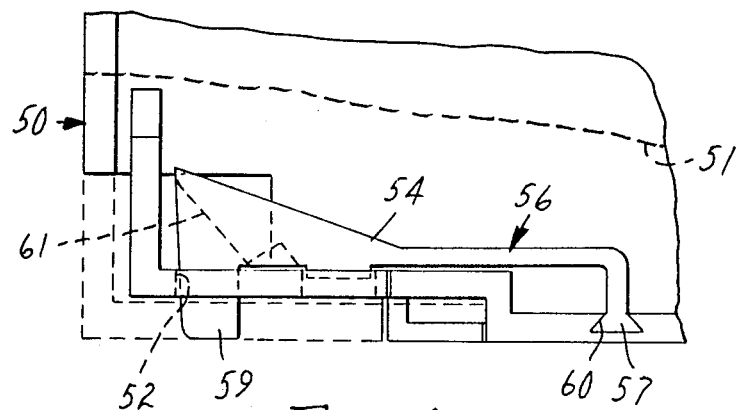
FIG. 6 is a fragmentary top view of a Betamax videocassette which has a third door-latching mechanism of the invention.
Figure 7:
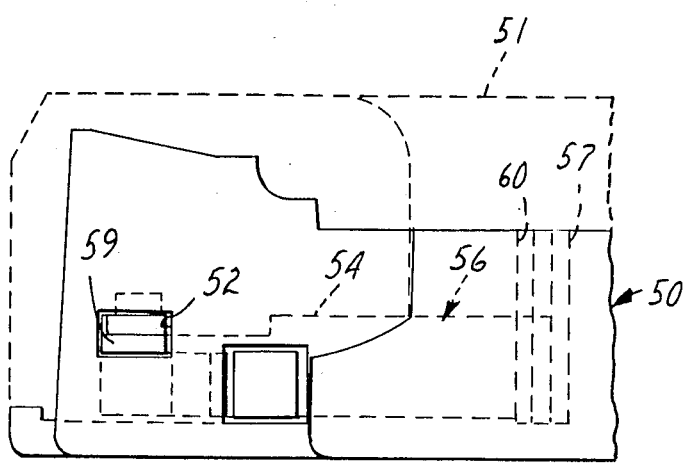
FIG. 7 is a fragmentary elevation of the videocassette of FIG. 6.

The Betamax videocassette fragmentally shown in FIGS. 6 and 7 has a molded plastic base 50 and cover 51 that together provide a casing on which is pivotably mounted a visor-like door (shown in phantom). A separate plastic piece 56 has a triangular tongue 57 that fits into a groove 60 in the base 50 and is secured by assembling the cover onto the base. At the other end of the plastic piece 56 is an arm 54, and free end of which is formed with a door-locking pawl 59 that projects through an opening 52 in the wall of the base 50. Upon inserting the videocassette into a recorder (not shown), a finger of the recorder contacts an inclined plane 61 which also is formed in the arm. This pivotably flexes the arm, thus unlocking the door-locking pawl 59 to release the visor-like door. Upon removing the videocassette from the recorder, the arm 54 returns to the position illustrated in FIG. 6 the door which is spring-loaded to close and to be locked by the pawl 59.

We claim:

1. Door-latching mechanisms for a cartridge that comprises a molded plastic casing on which is pivotably mounted a door affording access to the interior of the cartridge, said casing having a wall formed with an opening, a plastic arm attached to and projecting from the wall to provide a cantilevered plastic spring, the free end of the arm being formed with a door-locking pawl which extends through the opening to engage and lock the door when the spring is at rest, and unlock the door when the spring is flexed.

2. Door-latching mechanism as defined in claim 1 wherein said arm is integral with the casing.

3. Door-latching mechanism as defined in claim 1 wherein the arm is part of a separate piece of plastic attached to the casing.

4. Door-latching mechanism as defined in claim 3 wherein the casing is formed with a groove, and said separate piece of plastic is formed with a tongue which fits into said groove.

5. Door-latching mechanism as defined in claim 1 wherein said door-locking pawl is formed with a chamfer to cause it to be depressed when struck by a closing door.

6. Door-latching mechanism as defined in claim 1 wherein integral with the arm at its free end are two outward-projecting knobs, one in position to serve as said door-locking pawl and the other an unlocking knob in position to be depressed to unlock the pawl.

* * * * *